(12) United States Patent
Soeno et al.

(10) Patent No.: US 8,582,239 B2
(45) Date of Patent: Nov. 12, 2013

(54) MICROWAVE ASSISTED MAGNETIC RECORDING HEAD AND MAGNETIC RECORDING METHOD THEREWITH

(75) Inventors: Yoshikazu Soeno, Tokyo (JP); Kei Hirata, Tokyo (JP); Tsutomu Aoyama, Tokyo (JP); Isamu Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/527,735

(22) Filed: Jun. 20, 2012

(65) Prior Publication Data

US 2012/0320474 A1 Dec. 20, 2012

(30) Foreign Application Priority Data

Jun. 20, 2011 (JP) ................................. 2011-136318

(51) Int. Cl.
*G11B 5/31* (2006.01)
*G11B 5/02* (2006.01)
(52) U.S. Cl.
USPC ............... 360/125.3; 360/123.11; 360/119.02
(58) Field of Classification Search
USPC ........ 360/119.01–119.04, 122, 123.11, 125.3
See application file for complete search history.

(56) References Cited

U.S. PATENT DOCUMENTS

| | | | |
|---|---|---|---|
| 6,785,092 B2 | 8/2004 | Covington et al. | |
| 7,684,151 B2 | 3/2010 | Yamaguchi et al. | |
| 7,791,838 B2 | 9/2010 | Sato et al. | |
| 8,027,110 B1* | 9/2011 | Yamanaka et al. | 360/31 |
| 8,094,399 B2* | 1/2012 | Roppongi et al. | 360/55 |
| 8,264,916 B1* | 9/2012 | Aoyama et al. | 369/13.13 |
| 8,300,346 B2* | 10/2012 | Ikeda et al. | 360/59 |
| 8,427,773 B2* | 4/2013 | Aoyama et al. | 360/59 |
| 2013/0028058 A1* | 1/2013 | Yasui et al. | 369/13.14 |

FOREIGN PATENT DOCUMENTS

| | | |
|---|---|---|
| JP | A-2006-147786 | 6/2006 |
| JP | A-2007-189069 | 7/2007 |
| JP | A-2007-299460 | 11/2007 |
| JP | 2013054809 A * | 3/2013 |

OTHER PUBLICATIONS

L. H. Chen et al., "Effect of Post-Annealing on Ultra-High Frequency Properties of Amorphous Fe—Co—B Thin Films", *IEEE Transactions of Magnetics*, vol. 36, No. 5, Sep. 2000, pp. 3418-3420.

* cited by examiner

*Primary Examiner* — Will J Klimowicz
(74) *Attorney, Agent, or Firm* — Posz Law Group, PLC

(57) ABSTRACT

A microwave assisted magnetic head includes a main magnetic pole; a trailing shield, a main coil for causing the main magnetic pole to generate a perpendicular recording field, at least one secondary coil for generating an in-plane alternate-current (AC) magnetic field with a frequency in a microwave band from a magnetic recording gap between the main magnetic pole and the trailing shield, nonmagnetic films formed on magnetic recording gap facing surfaces that are defined by the main magnetic pole and the trailing shield, the main magnetic pole and the trailing shield being configured with first soft magnetic films, and second soft magnetic films formed further on the surfaces of the nonmagnetic films. The second soft magnetic films have larger anisotropy fields than the first soft magnetic films have.

14 Claims, 15 Drawing Sheets

MICROWAVE ASSISTED MAGNETIC RECORDING HEAD AND MAGNETIC RECORDING METHOD THEREWITH

TECHNICAL FIELD

The present invention relates to a magnetic disk apparatus, and particularly to a magnetic recording head for a hard disk drive (HDD). More particularly, the present invention relates to a microwave assisted magnetic recording head and a magnetic recording method using the head.

BACKGROUND

The increase of the density and capacity of HDDs has been achieved by reduction of particles of a recording film that configures a recording medium and increasing a magnetic anisotropy field Hk thereof, and also by down-sizing of a recording element of a magnetic head that records digital information to the recording medium and improving the material of a recording element. In recent years, HDDs with perpendicular magnetic recording system, which is suitable for high density recording, have been mainly used, and further increase of the density and capacity in the future has been anticipated.

On the other hand, in accordance with the reduction of recording bits and magnetic particles, thermal fluctuation of recording magnetization is more likely to occur. Accordingly, it is preferred to increase the magnetic anisotropy field Hk and coercive force Hc of the recording film.

However, when the Hk of the recording layer is increased, the Hc is also increased to 5 k (Oe) or more. It is normally said that a recording field that is twice or more of coercive force Hc is required to perform saturation magnetic recording of digital data to a recording medium. Therefore, it has been required to intensify a recording field that is generated from a recording element of a magnetic head, and a saturation magnetic flux density Bs of a recording element film has been increased. However, as the Slater-Pauling curve has shown, the saturation magnetic flux density is peaked at approximately 2.4 (T). Therefore, recording and erasing of digital data becomes difficult, causing difficulty to proceed the increase of the density and capacity of the HDDs.

In order to resolve such a situation, a new recording system with microwave assist has been proposed (see for example a patent literature 1). In the new recording system, a spin torque oscillator (STO) is formed in a magnetic gap between a main magnetic pole and a trailing shield which are configuring a recording element of a magnetic head for perpendicular recording, the STO being configured with a multi-layered magnetic thin film, and a microwave magnetic field in an in-plane direction is generated by oscillation of the STO and is applied to the recording medium, exciting precession of a magnetization, so that magnetization reversal in a perpendicular direction is assisted. Specifically, a field generation layer (FGL) of the STO that is configured by the multi-layered magnetic thin film is made to oscillate at a high frequency, a leaking magnetic field that is generated from a surface thereof is applied to the recording medium, and thereby the microwave assist is performed. The above-described assist system is referred to as an internal-oscillation system (see for example the patent literature 1).

However, the STO has significant technical problems such as that:
(1) lamination of a multi-layered magnetic thin film is necessary and a process thereof is extremely complex;
(2) in order that the STO oscillates, a magnetic film with extremely high magnetic anisotropy is necessary;
(3) a current density of current that is applied to the STO is an unique control parameter of an oscillation frequency, and the control is difficult because the oscillation frequency drastically changes by slight change of the current density; and
(4) as the current density of current that is applied to the STO increases, a generated magnetic field (hereinafter, is also referred to as generation magnetic field) increases and the oscillation frequency also changes, and thereby it is difficult to arbitrarily control each parameter independently.

In contrast to the internal-oscillation system, an external-oscillation system head device has been proposed, in which a secondary coil is arranged in a magnetic recording gap between a main magnetic pole and a trailing shield that faces the main magnetic pole configuring a recording element of a magnetic head, high frequency current in a microwave band is driven from an outside oscillator to the secondary coil to generate a high frequency in-plane magnetic field in the magnetic recording gap; and the high frequency in-plane magnetic field is superimposed on a perpendicular recording field that is generated by the main magnetic pole to assist magnetization reversal. The above-described assist system is referred to as an external-oscillation system (see for example a patent literature 2).

The external-oscillation system enables to apply an in-plane alternate-current (AC) magnetic layer at a high frequency in the microwave band to a recording film of the recording medium in a superimposing manner, and due to the assist effect, the intensity of a perpendicular recording field that is required for magnetization reversal of a medium recording layer can be significantly reduced, the perpendicular recording field being generated by the main magnetic pole. Also, high-speed recording and erasing of data to a recording layer with intense coercive force Hc becomes possible. Further, because the alternate-current (AC) magnetic field in the in-plane direction in the microwave band is generated by driving high frequency current to the secondary coil from the outside oscillator, the external-oscillation system has characteristics that the internal-oscillation system of the STO does not have such as:
(1) a frequency control of the high frequency current in ppm order is possible;
(2) a control of the in-plane generation magnetic field becomes easy by controlling amplitude of the high frequency current;
(3) as a result, it becomes possible to control separately the frequency in the microwave band and the in-plane AC magnetic field to generate, and setting of a frequency that is tuned to the ferromagnetic resonance frequency fRm of the recording medium and an optimal design of the magnetic head which an optimal distribution with the perpendicular recording field is considered become possible; and
(4) mass production is easy because the magnetic head structure is simple.

As described above in the external oscillation system, recording current that corresponds to digital data is driven to a main coil arranged near the main magnetic pole to generate the perpendicular recording field to the recording medium from the main magnetic pole. Simultaneously with this operation, high frequency current in the microwave band is applied to the secondary coil arranged in the magnetic recording gap between the main magnetic pole and the trailing shield. Due to magnetic flux induction, soft magnetic films that form the main magnetic pole and the trailing shield that faces the main magnetic pole are magnetized at a high frequency, and thereby a high frequency magnetic field in the in-plane direction is generated in the magnetic recording gap. The high frequency magnetic field is leaked from the gap and applied to the recording layer, and is superimposed on the perpendicular recording field, thereby assisting the magnetization reversal of the recording layer.

In order to increase the assist effect, the driving frequency of the high frequency current that is applied to the secondary coil is preferably 10 G (Hz) or more. However, the frequency of the high frequency magnetic field generated in the magnetic recording gap is peaked at the ferromagnetic resonance frequency fR of the soft magnetic films that form the main magnetic pole and the trailing shield, so that only the current with the ferromagnetic resonance frequency or less can be driven. Herein, the fR is shown by a following expression (see for example a non-patent literature 5).

$$fR = (\gamma/2\pi) \cdot (Hk \cdot 4\pi Ms)^{1/2} \quad (1)$$

$\gamma$: gyromagnetic constant, Hk: anisotropy field, Ms: magnetization $4\pi$Ms Bs Bs: saturation magnetization flux density Also, the assist magnetic field in the in-plane direction also need to have a ferromagnetic field of 1 k (Oe) or more. According to the expression (1), it needs only to increase Hk and Bs of the soft magnetic films in order to increase the fR, A soft magnetic film that is practically used for the main magnetic pole of the recording element of the magnetic head is mainly FeCo series, and Bs is 2–2.4 (T), which is large, and Hk is 5-30 (Oe), which is small (see for example patent literatures 3 and 4). In order to drive current to the secondary coil at a high frequency around 10 G (Hz), which is effective for the magnetization reversal assist, or more and to apply the in-plane high frequency magnetic field of 1 k (Oe) or more to the recording film, soft magnetic films that have sufficiently high ferromagnetic resonance frequency fR and a recording element structure are required to accomplish.

Also in the external-oscillation system, a generation magnetic field is peaked when the main magnetic pole that forms the recording element is magnetically saturated even if excitation current is further increased, and also the linear response at a high frequency is less likely to accompany. As described above in the external-oscillation system, the perpendicular recording field is generated from the main magnetic pole due to the excitation of the main coil, and a tip of the main magnetic pole is magnetically saturated. In order to generate an intense assist magnetic field in the in-plane direction from the magnetic recording gap, it is required to drive current in a high frequency preventing the effect of the magnetic saturation of the main magnetic pole.

Also in the external-oscillation system, a formulation validates that application of a bias magnetic field to the soft magnetic films is effective to further increase the fR of the soft magnetic films (see for example the non-patent literature 5). A parameter h thereof is defined as follows.

$$h = (HB + Hk)/Hk$$

HB; bias magnetic field

When the HB is increased, the h is also increased, and thereby the fR is increased. However, a technology that realizes the application of the bias magnetic field with a practical recording element structure has not been obvious yet, so there has been necessity to make it obvious in detail.

Next, related literatures are listed.

Patent Literatures

[Patent Literature 1] U.S. Pat. No. 6,785,092
[Patent Literature 2] JP Laid-Open Patent Application No. 2007-299460
[Patent Literature 3] JP Laid-Open Patent Application No. 2006-147786
[Patent Literature 4] JP Laid-Open Patent Application No. 2007-189069

Non-Patent Literature

[Non-Patent Literature 5] L. H. Chen al. IEEE Trans. Magn., Vol. 36, No. 5, p. 3418 (2000)

In order to increase recording density, it is required to further increase a magnetization reversal assist effect. In order to achieve that, it needs to drive current to a secondary coil at a high frequency to generate an intense in-plane high frequency magnetic field from a magnetic recording gap, and it needs to realize a recording magnetic pole material with a sufficiently high ferromagnetic resonance frequency fR and a recording element structure. It has been known that the Hk and Bs of a soft magnetic film that is a material of a main magnetic pole and a trailing shield should be increased to realize those; however, a magnetic field in a perpendicular direction is applied to a recording magnetic pole due to excitation of a main coil, so that it is necessary to avoid the effect of magnetic saturation of the main magnetic pole. The present invention has been invented to achieve the above-described technical subjects, and a microwave assisted magnetic recording head that is intended to further increase the magnetization reversal assist effect is provided.

SUMMARY

A microwave assisted magnetic head of the present invention includes a main magnetic pole, a trailing shield, a main coil for causing the main magnetic pole to generate a perpendicular recording field, at least one secondary coil for generating an in-plane alternate-current (AC) magnetic field with a frequency in a microwave band from a magnetic recording gap between the main magnetic pole and the trailing shield, nonmagnetic films formed on magnetic recording gap facing surfaces that are defined by the main magnetic pole and the trading shield, the main magnetic pole and the trailing shield being configured with first soft magnetic films. Further, second soft magnetic films are formed further on the surfaces of the nonmagnetic films. The second soft magnetic films have larger anisotropy field (so called Hk) than the first soft magnetic films have.

Easy magnetization axes are provided with the first soft magnetic films and the second soft magnetic films in a track width direction, antiferromagnetic coupling structures are formed via a nonmagnetic film, and closed magnetic paths that circulate though the first soft magnetic film and the second soft magnetic film are formed. With the structure, a bias magnetic field is applied to each of the soft magnetic films.

When a recording current that corresponds to data to the main coil is applied, a tip portion of the main magnetic pole of the first soft magnetic film becomes magnetically saturated. However, the second soft magnetic film with large anisotropy field Hk is not magnetically saturate, allowing the linear response of a high frequency magnetic flux.

Because the first soft magnetic film and the second soft magnetic film form the antiferromagnetic coupling structure via the nonmagnetic film, a residual magnetization state is stable, so that pole erasure and side erase are reduced. As a result, the reliability of the HDD is increased.

In the present invention, following configurations are also preferred.

A plurality of the secondary coils is provided with the microwave assisted magnetic head.

Easy magnetization axes are provided with the first soft magnetic films and the second soft magnetic films in a track width direction, antiferromagnetic coupling structures are formed via the nonmagnetic films, and closed magnetic paths that circulate though the first soft magnetic films and the second soft magnetic films are formed.

Lamination widths in a track width direction of the non-magnetic film and the second soft magnetic film that are firmed at a trailing of the main magnetic pole are larger than a trailing width of the main magnetic pole.

In another view, lamination widths in a track width direction of the nonmagnetic film and the second soft magnetic film that are formed at a trailing of the main magnetic pole are equal to or smaller than a trailing width of the main magnetic pole.

In a view from an air bearing surface, a circumference of the main magnetic pole is covered by a magnetic gap film and a magnetic recording gap film that continue, and a writing shield film is arranged in a periphery of the magnetic gap film and the magnetic recording gap film.

On an air bearing surface of the main magnetic pole, the main magnetic pole has a trapezoidal shape of which a long side is on a trailing side of the main magnetic pole.

With respect to the first soft magnetic film, Fe and Co are main components, the anisotropy field is 5-30 (Oe), and a saturation magnetic flux density is 2.2-2.4 (T).

In another view, with respect to the second soft magnetic film, Fe, Co and B are main components, an addition amount of B is 5-20 (at %), the second soft magnetic film has an anisotropy parallel to a film surface and an anisotropy field thereof is 40-800 (Oe), a saturation magnetic flux density is 2.0-2.4 (T), and a film thickness is 5-20 (nm).

In another view, with respect to the second soft magnetic film, Fe, Co and B are main components, an addition amount of B is 5-20 (at %), the second soft magnetic film has an anisotropy in a parallel and perpendicular directions to a film surface, and an anisotropy field thereof is 60-800 (Oe), a saturation magnetic flux density is 2.0-2.4 (T), and a film thickness is 5-20 (nm).

A material of the nonmagnetic film that is formed on the one of the magnetic recording gap facing surfaces of the first soft magnetic film is Ru, Rh, Cr, Re, Au, Ag, or Pt, and a film thickness thereof is 1-5 (nm).

A reproducing element provided with a magneto-resistive effect element having one of a TMR element and a GMR element is further provided.

In another view, the present invention relates to a magnetic recording method using the microwave assisted magnetic head discussed above. In the method, a perpendicular recording field is generated from a recording magnetic pole part that is a tip portion of the main magnetic pole to a recording medium by driving a recording current that corresponds to data to the main coil. Coincidentally, an in-plane alternate-current (AC) magnetic field is generated from the magnetic recording gap between the main magnetic pole and the trailing shield by driving AC current in a microwave band to the secondary coil in order to assist magnetization reversal of the recording medium Further, a frequency of alternate-current (AC) current that drives the secondary coil is a high frequency, which is equal or close to a ferromagnetic resonance frequency of a recording medium, or of which band is within approximately 5-30 G(Hz), which is close to the ferromagnetic resonance frequency, and an in-plane alternate-current magnetic field generated by the frequency is less intense than a perpendicular recording field.

In the microwave assisted magnetic head of the present invention, nonmagnetic films are formed on magnetic recording gap facing surfaces that are defined by a main magnetic pole and a trailing the main magnetic pole and the trailing shield being configured with first soft magnetic films. Second soft magnetic films, of which an anisotropy field is larger than that of the first soil magnetic film, are formed further on the surfaces of the nonmagnetic films. Accordingly, a microwave assisted magnetic head with higher magnetization reversal assist effect can be realized.

DETAILED DESCRIPTION

Figure 1:
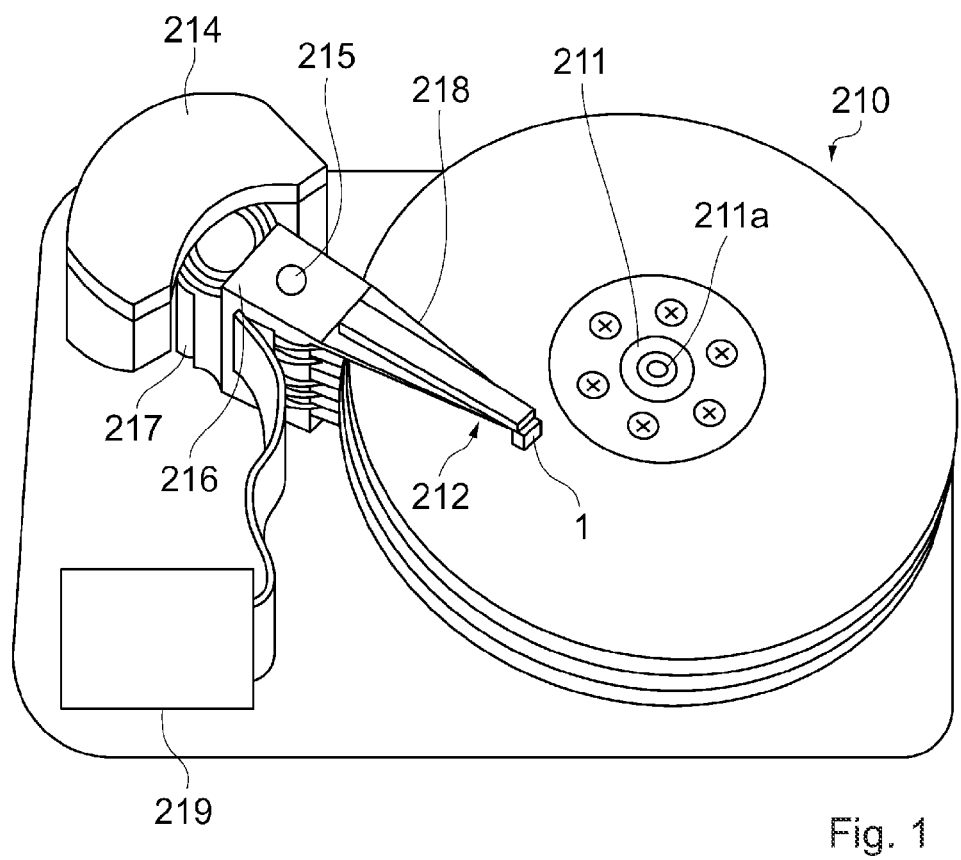
FIG. 1 is a perspective view of a magnetic disk apparatus according to embodiments.

Hereinafter, descriptions of preferred embodiments of the present invention are given as referring to the drawings. It should be noted that the present invention is not limited to the embodiments which are described below. Further, it should be noted that components described below may be replaced with other components that are obvious to those skilled in the art and are substantially equal. Further, the components described below may be combined on an optional basis. In the drawings, the same component is illustrated with the same reference number. For the purpose of easy viewing of the drawings, the dimensional ratio of/between components in the drawings is not always accurately illustrated and may vary on an optional basis. A X-axis direction illustrated in FIG. 3 through FIG. 11 corresponds to a track width direction, and a size in the X-axis direction is occasionally referred to as "width". A Y-axis direction illustrated in FIG. 2 through FIG. 11 corresponds to a depth direction of an element, and a side of the Y-axis direction that is close to an air bearing surface (ABS) that is a surface of a thin film magnetic head facing a recording medium is occasionally referred to as a "front-side", and a side opposite (on the deep side) to the front side is occasionally referred to as a "back-side."

Figure 4:
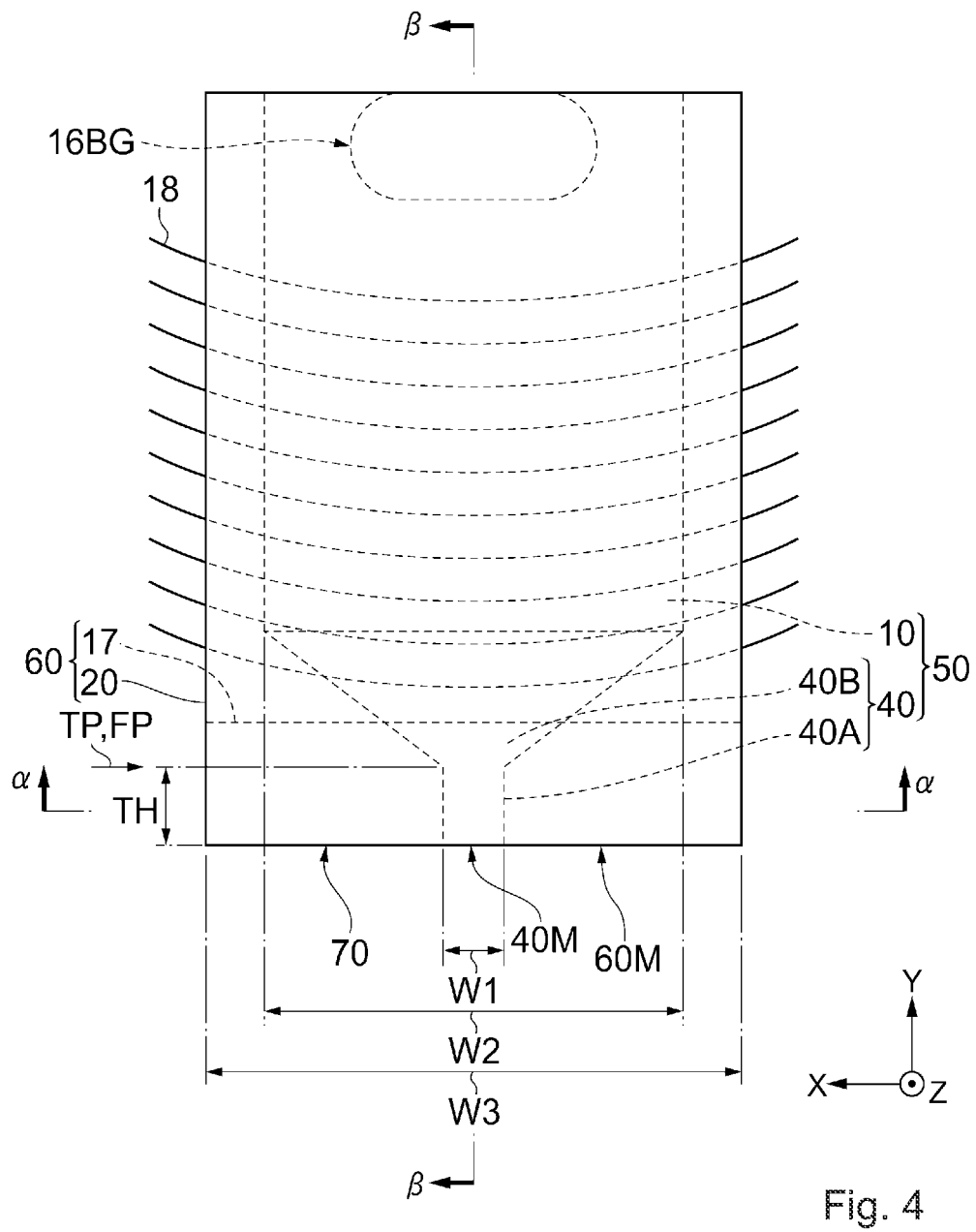
FIG. 4 is a plan view (in a lamination direction) of a recording element of a magnetic head according to the embodiments.
Figure 5:
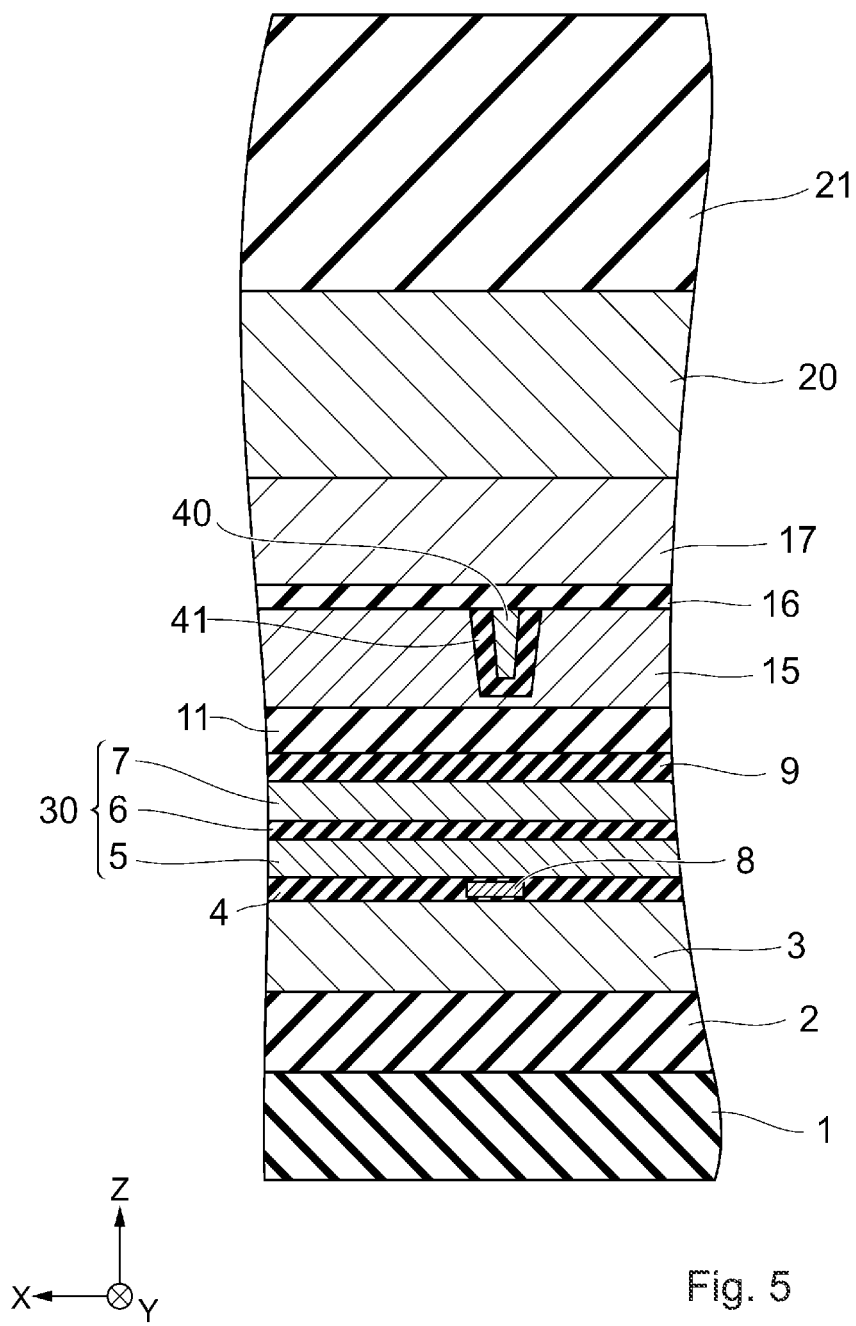
FIG. 5 is a cross-sectional view cut along an α-α line of FIG. 4 according to the first embodiment.
Figure 6:
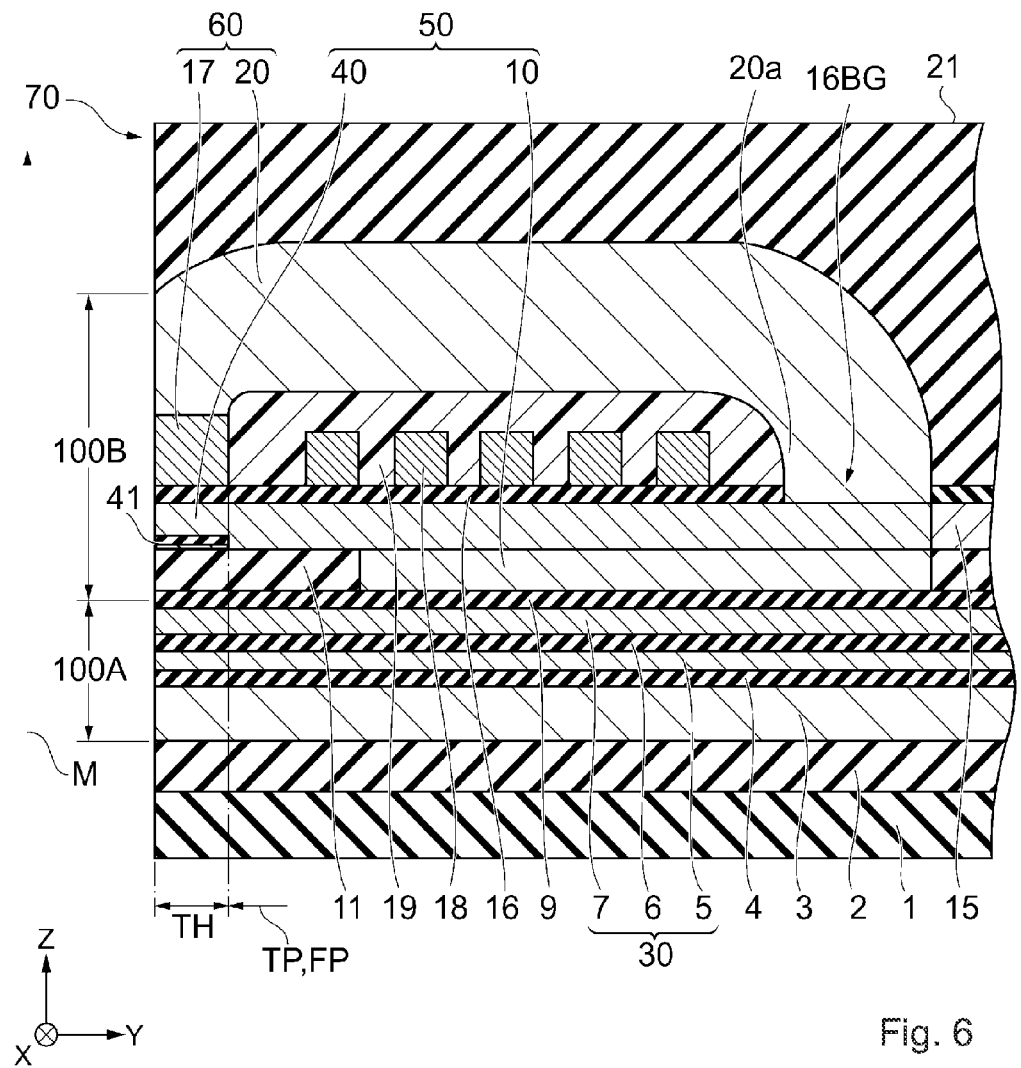
FIG. 6 is a cross-sectional view cut along a β-β line of FIG. 4.

A Z-axis direction illustrated in FIG. 2 through FIG. 11 corresponds to a direction in which lamination films are laminated for configuring the element, is so-called a thickness direction, and is a traveling direction of the magnetic disk (direction M in FIG. 6). The magnetic disk travels from a negative side (leading side, front end side) of the Z-axis direction toward a positive side (trailing side, rear-end side) of the Z-axis. A direction in which lamination films are laminated may be referred to as "upward" or "upper side," and a direction opposite thereto may be referred to as "downward" or "lower side."

Figure 2:
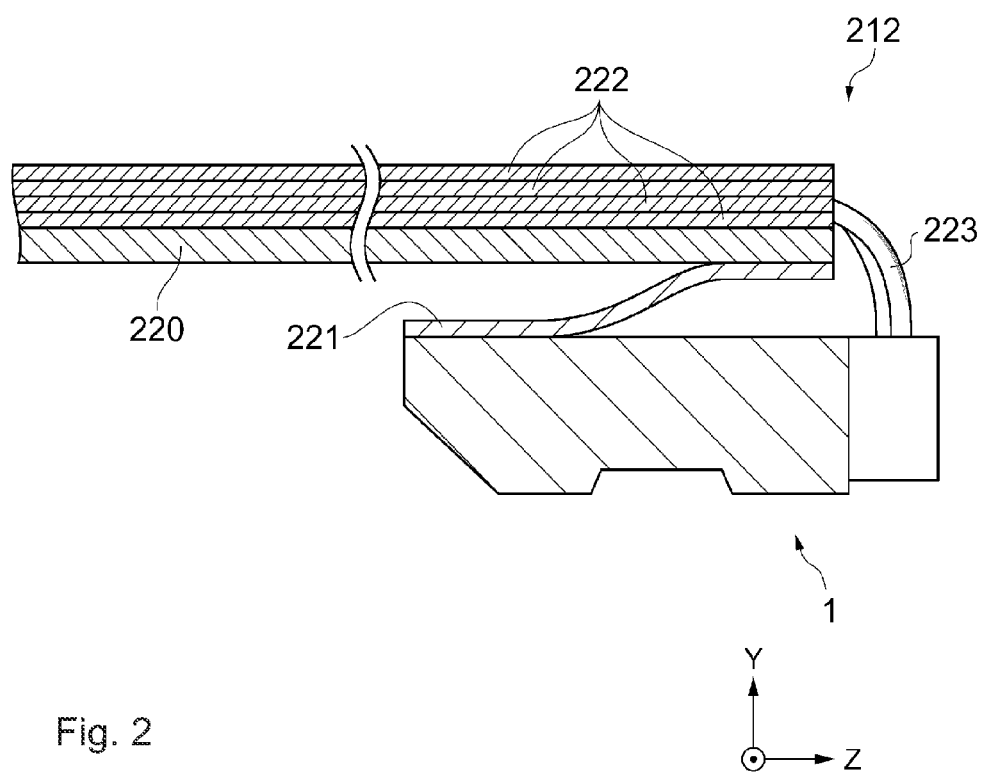
FIG. 2 is a cross-sectional view of a tip end part of a head gimbal assembly of the magnetic disk apparatus illustrated in FIG. 1.

FIG. 1 is a perspective view that schematically illustrates a configuration of a main part of a magnetic disk apparatus (HDD) according to a first embodiment of the present invention. The magnetic disk apparatus herein may be replaced with a magnetic recording reproducing device. FIG. 2 is a cross-sectional view that illustrates a portion of a tip end of a head gimbal assembly (HGA) of the magnetic disk apparatus illustrated in FIG. 1.

FIG. 1 illustrates the magnetic disk apparatus, and illustrates a plurality of magnetic disks 210 that are rotated around a rotational shaft 211a by a spindle motor 211. Each of head gimbal assemblies (HGA) 212 is configured to allow a slider base substrate 1 to appropriately face a surface of one of the magnetic disks 210, the slider base substrate 1 including a thin film magnetic head structure for conducting writing of data signal to and reading of data signal from the one of the magnetic disks 210. An assembly carriage device 214 is configured to position the slider base substrate 1 above a track of the one of the magnetic disks 210, the slider base substrate 1 including the thin film magnetic head structure.

The assembly carriage device 214 is configured mainly with a carriage 216 that is angularly swingable around a pivot bearing shaft 215 and a component that drives the carriage 216 in an angularly swinging manner, which is for example a voice coil motor (VCM) 217. In the carriage 216, base parts of a plurality of driving arms 218 are attached, the driving arms 218 being stacked in the direction of the pivot bearing shaft 215, and one of the HGAs 212 is firmly attached to a tip end part of one of the driving arms 218. Note, it is also possible for the magnetic disk apparatus to be provided with a single piece of the magnetic disks 210, a single piece of the driving arms 218, and a single piece of the HGAs 212. The magnetic disk 210 is grounded via the spindle motor 211 and the rotational shaft 211a.

FIG. 1 illustrates a control circuit 219 that is configured to control recording and reproducing operations of the thin film magnetic head provided on the slider body substrate 1. It is also possible to install in the control circuit 219 a driving source of high frequency current for assist, the current being applied to a secondary coil that is used in the present invention. Further, it is also possible to install a control system that allows amplitude control and phase control of the current. However, positions to install such driving source, control system and the like are not limited to the inside of the control circuit 219, and the positions to arrange are arbitrarily selected depending on a design specification.

As illustrated in FIG. 2, the HGA 212 is provided with the slider body substrate 1, a load beam 220 and a flexure 221, and plural types of wiring members 222. The load beam 220 and the flexure 221 are configured to support the slider body substrate 1 and are made of a metal conductive material. The wiring members 222 include a wiring member for applying high frequency current for assist. According to a configuration illustrated in FIG. 2, the plural types of wiring members 222 are connected to terminal electrodes of the slider body substrate 1 via wire bonding using wires 223.

In the HGA 212, wiring members for a head element are also provided, the wiring members being for driving recording current that is applied to a recording element of the thin film magnetic head that is formed on the slider body substrate 1 and for applying constant current to a reproducing element to obtain reproducing output voltage. The slider body substrate 1 is attached to one end of the flexure 221 having elasticity, and a suspension that supports the slider base substrate 1 is configured with the flexure 221 and the load beam 220 to which the other end of the flexure 221 is attached.

(Description of Structure of Microwave Assisted Magnetic Head According to Embodiments)

A microwave assisted magnetic head according to the embodiments is provided with at least one secondary coil that is arranged near a recording magnetic pole part that is a tip portion of a main magnetic pole as a main portion of a configuration thereof and has a structure that generates an assist magnetic field in an in-plane direction that is parallel to a medium surface by AC current at a high frequency that is applied to the secondary coil. A plurality of the secondary coils may be provided. High frequency current in a microwave band is driven to the secondary coil from an outside, an in-plane magnetic field at a high frequency that is parallel to the medium surface is generated in a magnetic recording gap, the in-plain magnetic field is superimposed to a perpendicular magnetic field that is generated from the main magnetic pole and perpendicular to the medium surface, and as a result magnetization reversal is assisted. Although it may not be needless to say, the microwave assisted magnetic head is also provided with a recording magnetic pole part that is a fundamental structure portion for a magnetic head, a main coil for generating a recording field to the recording magnetic pole part, and the like.

Hereinafter, for the purpose of easy description of the configuration of the microwave assisted magnetic head (hereinafter, may be referred to simply as a "magnetic head") according to the embodiments, descriptions of basic configuration components that are fundamentals of the magnetic head and descriptions of a main portion of the configuration according to the embodiments are separately given.

(Descriptions Regarding Basic Configuration Components that are Fundamentals of Magnetic Head)

Figure 3:
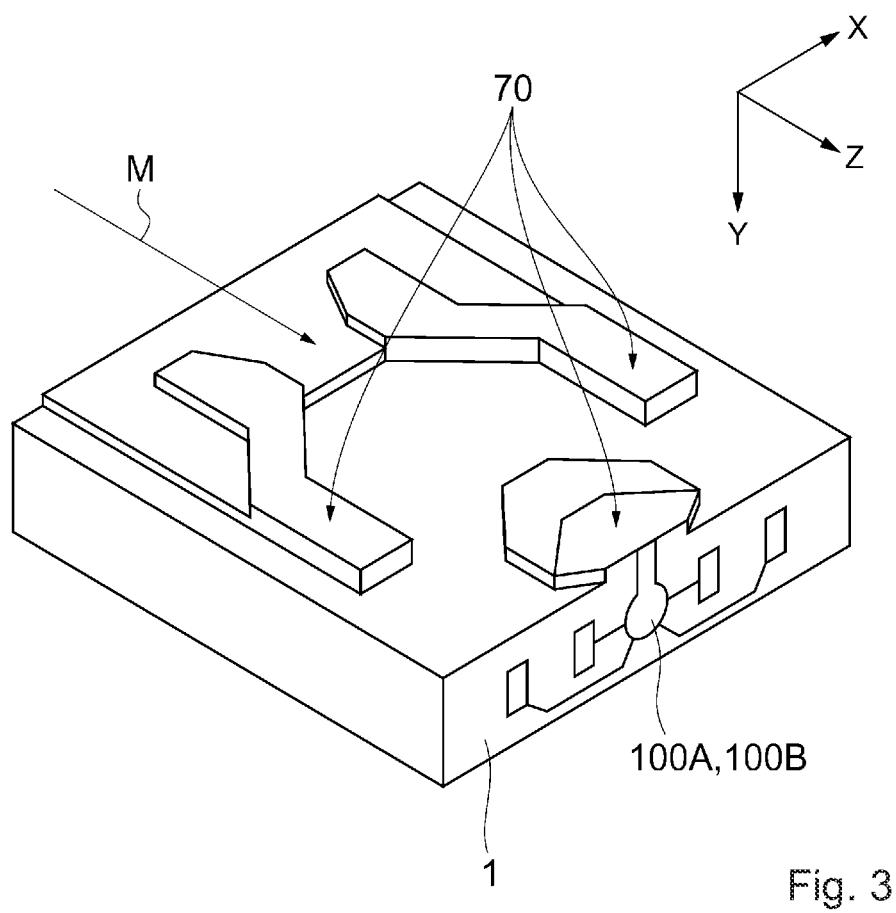
FIG. 3 is a perspective view of a magnetic head slider base substrate.

At first, descriptions regarding a structure of basic configuration components that are fundamentals of the magnetic head are given with reference to FIG. 3 through FIG. 7. It should be noted that illustrations of a main portion of the configuration according to the embodiments, the main portion having a minute linear structure, are omitted in the figures because of the spatial limitation of sheets. FIG. 3 is a perspective view that schematically illustrates an entire structure of the magnetic head. FIG. 4 is a plan view of a recording head part of the magnetic head. FIG. 5 is a cross-sectional view cut along an α-α line of FIG. 4. FIG. 6 is a cross-sectional view cut along a β-β line of FIG. 4.

As illustrated in FIG. 3, the magnetic head has the slider base substrate 1 having a substantially cuboid structure. The slider base substrate 1 has an air bearing surface (ABS) 70 that is directly related to flying characteristic, and is provided with a recording element 100B and a reproducing element 100A on a side end surface, the side end surface existing on an air flow-out end side (trailing edge side, rear end side) with respect to an air-flow direction M (identical to a substantially linear traveling direction of the magnetic recording medium having a disk shape) illustrated in FIG. 3 and FIG. 6.

FIG. 4 through FIG. 6 illustrate the recording element 100B and the reproducing element 100A in detail. The magnetic head illustrated in FIG. 3 through FIG. 6 is configured as a composite type head that allows to proceed both recording and reproducing. The magnetic head is configured by laminating an insulating film 2, the reproducing element 100A using magneto-resistive (MR) effect, a separation film 9, a recording element 100B that proceeds recording operation in a perpendicular recording system, and a nonmagnetic film 21 that eventually becomes an overcoat film on the slider body substrate 1 in this order.

(Description of Reproducing Element 100A)

The reproducing element 100A is configured by laminating, for example, a lower reading shield film 3, a shield gap film 4, and an upper reading shield film 30 in this order. In the shield gap film 4, a reproducing head element (MR element 8) is embedded such as to be exposed on the ABS 70 (see FIG. 5). It should be noted that reading is used to imply the meaning of reproducing.

Both the lower reading shield film 3 and the upper reading shield film 30 are configured to magnetically separate the MR element 8 from a periphery thereof, and are configured so as to extend from the ABS 70 toward the back-side. The lower reading shield film 3 is configured of a magnetic material such as, for example, a nickel-iron alloy (NiFe). The upper reading shield film 30 is configured such that, for example, two parts of upper reading shield film parts 5 and 7 are laminated so as to sandwich a nonmagnetic film 6. Each of the upper reading shield film parts 5 and 7 is configured of a magnetic material such as, for example, a nickel-iron alloy. The nonmagnetic film 6 is configured of a nonmagnetic material such as, for example, ruthenium (Ru) or alumina. It should be noted that the upper reading shield film 30 is not limited to the above-described three-layer structure, and may have an one-layer structure configured of a magnetic material such as, for example, a nickel-iron alloy (NiFe).

The shield gap film 4 is configured to electrically separate the MR element 8 from a periphery thereof, and is configured of a nonmagnetic insulating material such as, for example, alumina. The MR element 8 is configured with, for example, a giant magneto-resistive effect (GMR) element, a tunneling magneto-resistive effect (TMR) element, or the like.

(Description of Recording Element 100B)

The recording element 10013 includes a nonmagnetic film II, a magnetic pole film 50, a magnetic recording gap film 16 in which an opening part (back gap 16BG) for magnetic linkage is provided, a coil film 18 that is embedded in an insulating film 19, a magnetic film 60, and a first writing shield film (side shield) 15 and a second writing shield film (trailing shield) 17 that are so-called writing shield films of a wrap-around structure. It should be noted that writing is used to imply the meaning of recording.

In FIG. 5, the nonmagnetic film 11 is configured of a nonmagnetic material such as for example alumina to electrically and magnetically separate an auxiliary magnetic pole film 10 from a periphery thereof. The magnetic pole film 50 extends from the ABS 70 toward the back-side and includes the auxiliary magnetic pole film 10 and a main magnetic pole film 40. It is also possible to arrange the auxiliary magnetic pole film 10 and the main magnetic pole film 40 in a reversed order in the vertical direction (Z direction) depending on design specification. Also, a magnetic layer for linkage that is formed in a linkage yoke 20a for magnetic linkage may also be referred to as the back gap 16BG as an opening part for magnetic linkage.

The auxiliary magnetic pole film 10 extends from a position recessed from the ABS 70 to the linkage yoke 20a. The auxiliary magnetic pole film 10 is arranged on, for example, the leading side with respect to the main magnetic pole film 40, and also as illustrated in FIG. 4 has a rectangular plane shape (width size W2). The auxiliary magnetic pole film 10 may also be positioned on the trailing side of the main magnetic pole film 40 as described above.

The main magnetic pole film 40 extends from the ABS 70 to the linkage yoke 20a. The main magnetic pole film 40 includes, for example, a recording magnetic pole part 40A and a body part 40B. The recording magnetic pole part 40A extends from the ABS 70 toward the back side and has a narrow width. The body part 40B is on the back side of the recording magnetic pole part 40A in a connected manner and has a wide width. The recording magnetic pole part 40A is substantially a magnetic flux emitting part (so-called magnetic pole film) and has a constant width size W1 that defines a recording track width. The body part 40B is a magnetic flux supplying part to the recording magnetic pole part 40A, and has the width size W2 that is larger than the width size W1. The width of the body part 40B narrows as getting close to the recording magnetic pole part 40A that is the tip portion of the main magnetic pole on the front side. The point where the width size of the main magnetic pole film 40 starts to flare from the width size W1 to the width size W2 is a so-called flare point FP.

The main magnetic pole film 40 has an end surface 40M on the side that is close to the ABS 70. The end surface 40M has a trapezoidal shape where a long side positioned on the trailing side is an upper base and a short side positioned on the leading side is a bottom base. An upper end edge (on the side of the long side) of the trapezoidal shape is a substantial recording portion. The magnetic recording gap film 16 is configured of, for example, a nonmagnetic insulating material such as alumina or a nonmagnetic conductive material such as ruthenium to magnetically separate the magnetic pole film 50 from a magnetic film 60.

The main coil 18 is configured to generate a perpendicular recording field to the recording medium for magnetic recording and is configured of, for example, a high conductivity material such as a cupper (Cu). The main coil 18 has a winding structure (spiral structure) in which the main coil 18 winds around the linkage yoke 20a (back gap 16BG) as illustrated in FIG. 4. The insulating film 19 is configured of for example a nonmagnetic insulating material to electrically separate the main coil film 18 from a periphery thereof. The nonmagnetic insulating material is a photoresist that has fluidity during heating, a spin on glass (SOG), or the like. The most front end position of the insulating film 19 is a throat height zero position TP, and a distance between the throat height zero position TP and the ABS 70 is a so-called throat height TH. FIG. 4 illustrates a case where the throat height zero position TP matches the flare point FP.

The magnetic film 60 intake a spreading component of a magnetic flux that is emitted from the magnetic pole film 50 to make a gradient of a perpendicular recording field steeper, and also intakes a magnetic flux returning from the recording medium to circulate a magnetic flux between the recording element 100B and the recording medium. The magnetic film 60 extends from the ABS 70 toward the back-side on the trailing side of the magnetic pole film 50. Accordingly, the magnetic film 60 is distanced from the magnetic pole film 50 on the front side by the magnetic recording gap film 16 and also is linked to the magnetic pole film 50 on the back-side via the linkage yoke 20a therebetween. An end surface 60M of the magnetic film 60 on the side that is close to the ABS 70 has, for example, a rectangular shape with a width size W3 that is larger than the width size W1 as illustrated in FIG. 4. The magnetic film 60 includes, for example, the second writing shield (trailing shield) film 17 and a return yoke film 20, each of which has a separate body.

The first and second writing shield films 15 and 17 have mainly a function of increasing a perpendicular recording field gradient, and are configured of a high saturation magnetic flux density magnetic material such as, for example, a nickel-iron alloy and an iron-based alloy. The first and second writing shield films 15 and 17 configure a so-called wrap-around structure. Then, because these films and the magnetic film 20 are positioned on the trailing side, these films and the magnetic film 20 each are occasionally referred to as a trailing shield.

(Description of Main Part of Configuration according to Embodiments)

Descriptions regarding a structure of a wrap-around structure according to a first embodiment as illustrated in FIG. 5 are given. The first writing shield film 15 is located adjacent to both side surfaces of the recording magnetic pole part 40A on the ABS side via a magnetic gap film 41 therebetween, the recording magnetic pole part 40A being the tip portion of the main magnetic pole film 40. Therefore, in both side portions of the recording magnetic pole part 40A, a side shield film is formed by the first writing shield film 15. The second writing shield film 17 is located adjacent to an upper surface of the recording magnetic pole part 40A on the ABS side via the magnetic recording gap film 16 therebetween. The second writing shield film 17 is also referred to as a pedestal yoke, and a film that is sandwiched between the second writing shield (trailing shield) film 17 and the upper surface of the recording magnetic pole part 40A is the magnetic recording gap film 16.

According to the above-described structure, the first and second writing shield films 15 and 17 intake the spreading component of the magnetic flux emitted from the magnetic pole film 50, increase the magnetic field gradient of the perpendicular magnetic field, and narrow a recording width. The second writing shield (trailing shield) film 17 extends from the ABS 70 toward the back-side as being adjacent to the magnetic recording gap film 16, and is adjacent to the insulating film 19 on the back end. Thereby, the writing shield film 17 has a function that defines a most-front end position (throat height zero position TP) of the insulating film 19.

The return yoke film 20 has a circulation function of a magnetic flux and is configured of for example the magnetic material that is the same as the material of the writing shield (trailing shield) film 17. The return yoke film 20 extends from the ABS 70 to the linkage yoke 20a on the insulating film 19 on the trailing side of the writing shield film 17 as illustrated in FIG. 6, and is linked to the writing shield film 17 on the front side and is linked to the magnetic pole film 50 via the linkage yoke 20a on the rear-side. The nonmagnetic film 21 is configured of a nonmagnetic insulating material such as for example alumina to (protect the magnetic head.

Figure 7:
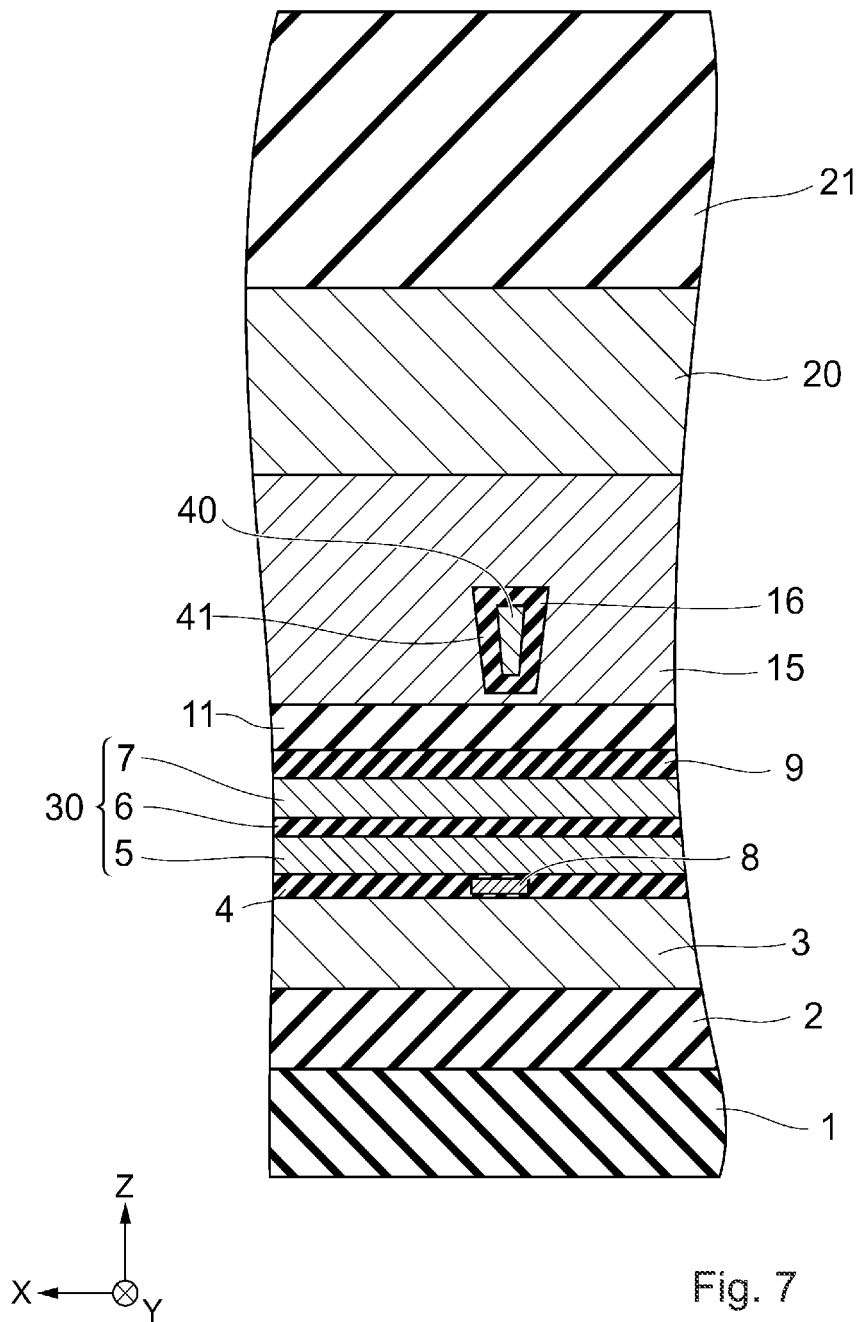
FIG. 7 is a cross-sectional view cut along the α-α line of FIG. 4 according to the second embodiment.

Description regarding a structure of a wrap-around structure according to a second embodiment illustrated in FIG. 7 is given. In this example, the magnetic gap film 41 and the magnetic recording gap film 116 that is positioned on the upper side of the magnetic gap film 41, which are continued and made of the same material having the same film thickness, cover an entire circumference of the recording magnetic pole part 40A that is the tip portion of the main magnetic pole film 40, and the writing shield film 15 that corresponds to the first and second writing shields (15 and 17) is arranged in the periphery of the magnetic gap film 41 and the magnetic recording gap film 16. In other words, the structure in which the recording magnetic pole part 40A is embedded in the writing shield film 15 is used, the shield film positioned on the both sides of the recording magnetic pole part 40A functions as the side shield film, and the shield film positioned on the upper side functions as the second writing shield (trailing shield) film as illustrated in FIG. 3 through FIG. 6. Also, the wrap-around structure is not limited to the above-described configuration, and other various configurations may be accepted. Also, as may be obvious from the description which will be described later, the configuration of the main part of the present invention is not applied only to a head having the wrap-around structure.

As described above, by driving current at a high frequency of around 10 G(Hz) or more to the secondary coil, an in-plane high frequency magnetic field that is parallel to the medium surface is generated from the magnetic recording gap. The frequency of around 10 G (Hz) is an effective frequency to make the magnetization reversal assist of the microwave assist magnetic head using a conventional secondary coil, I order to achieve that, a recording magnetic pole material with sufficiently high ferromagnetic resonance frequency fR and the recording element structure are required to realize. However, in order to realize the material and the structure, there are some subjects to be resolved. One of the subjects is to avoid the effect of magnetic saturation of the main magnetic pole for generating an intense in-plane high frequency magnetic field because a magnetic field in a perpendicular direction that is perpendicular to the medium surface is also applied to the recording magnetic pole due to excitation of the main coil. Another subject is to realize a recording element structure that allows to apply a bias magnetic field in the track width direction of the recording magnetic pole to further increase the R of the material of the recording magnetic pole.

Figure 8:
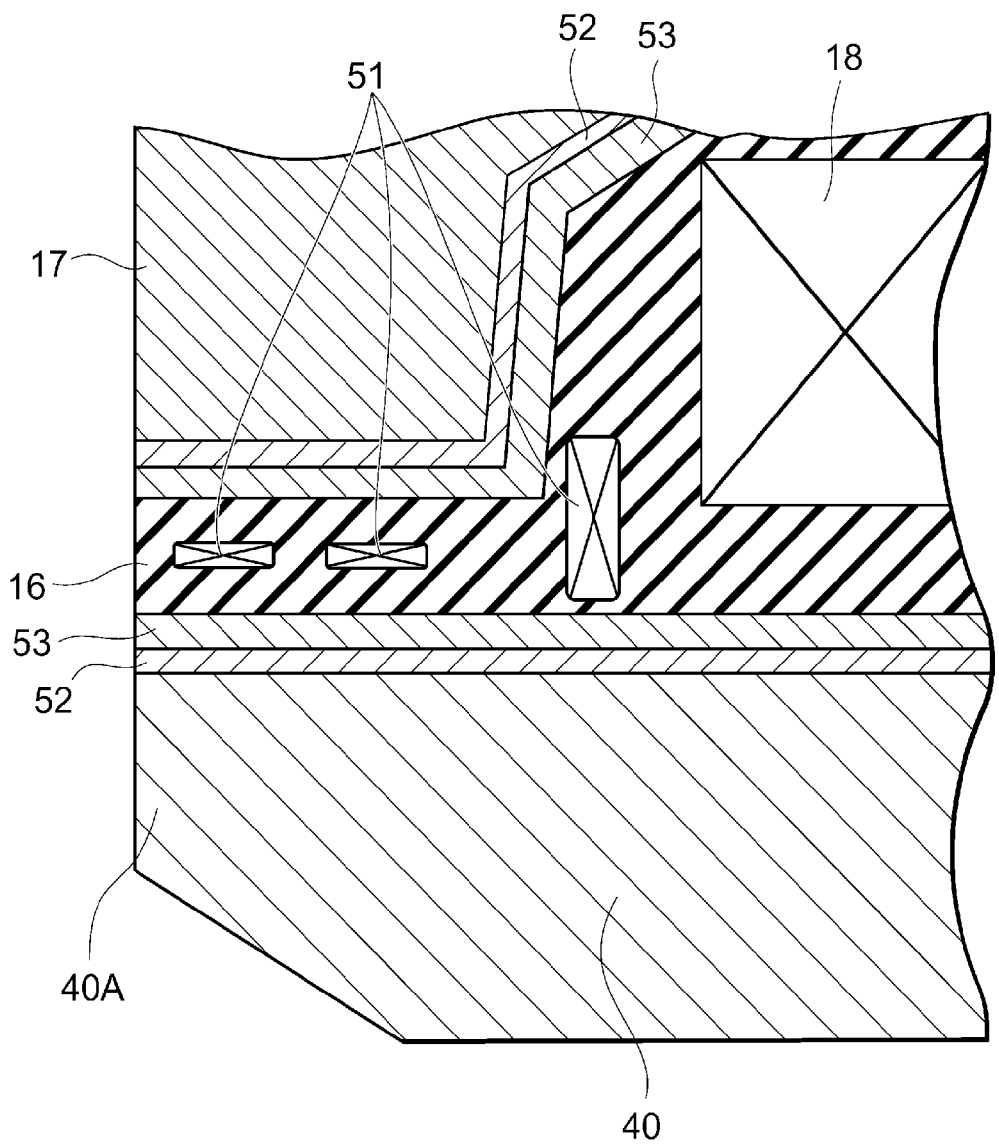
FIG. 8 is a cross-sectional view of the recording element of the magnetic head according to the embodiments.

FIG. 8 illustrates a cross-sectional view illustrating a structural example of the recording element part 100B of the microwave assisted magnetic head in the magnetic head traveling direction (Z direction) according to the first and second embodiments. The recording element part includes the main magnetic pole film 40 and the trailing shield film 17 that are formed with a first soft magnetic film, a main coil 18, and a plurality of secondary coils 51. On the surfaces (is also referred to as magnetic recording gap facing surfaces) of the main magnetic pole film 40 and the trailing shield film 17 that are formed with the first soft magnetic film, nonmagnetic films 52 and second soft magnetic films 53 are laminated. The nonmagnetic film 52 is an ultrathin film of 1-5 (nm) that is made of Ru, Rh, Cr, Re, Au, Ag, or Pt. The first soft magnetic film is mainly composed of Fe and Co, and has an anisotropy field of 5-30 (Oe) and a saturation magnetic flux density of 2.2-2.4 (T). The second soft magnetic film is mainly composed of Fe, Co, and B, and an addition of B is 5-20 (at %). The second soft magnetic film has anisotropy parallel to a film surface thereof, and an anisotropy field thereof is 40-800 (Oe), a saturation magnetic flux density thereof is 2.0-2.4 (T), and a film thickness thereof is 5-20 (nm). Compared to the first soft magnetic film, the second soft magnetic film has a larger anisotropy field Hk. The larger anisotropy field has the effect of increasing the ferromagnetic resonance frequency fR of the soft magnetic films.

At least one of the secondary coil 51 is arranged between the main magnetic film 40 and the trailing shield film 17 in the periphery of the recording magnetic pole part 40A that is the tip portion of the main magnetic film 40 so as to surround the linkage part 20a (FIG. 6) that links the main magnetic pole film 40 and the trailing shield film 17. The secondary coil 51 is not necessarily to be a winding type coil. As long as the coil is able to generate a required high frequency magnetic field, the entire shape, structure, and materials are design matters.

Recording current that corresponds to data is driven to the main coil 18, and a recording field is applied in the perpendicular direction of the medium from the recording magnetic pole part 40A. Due to this recording operation, the recording magnetic pole part 40A that is the tip portion of the main magnetic pole film 40 that is formed with the first soft magnetic film is magnetically saturated; however, because the recording magnetic pole part 40A that is formed with the second soft magnetic film has a large anisotropy field Hk, the recording magnetic pole part 40A is not magnetically saturated, allowing linear response of a magnetic flux. AC current at a high frequency is applied to at least one of the secondary coil 51 during the recording operation, and then a high frequency magnetic field in the in-plane direction that is parallel to the medium surface from a tip of the magnetic recording gap 16. The high frequency magnetic field in the in-plane direction is superimposed to the recording field in the perpendicular direction that is perpendicular to the medium surface, and thereby the magnetization reversal is assisted.

Figure 9:
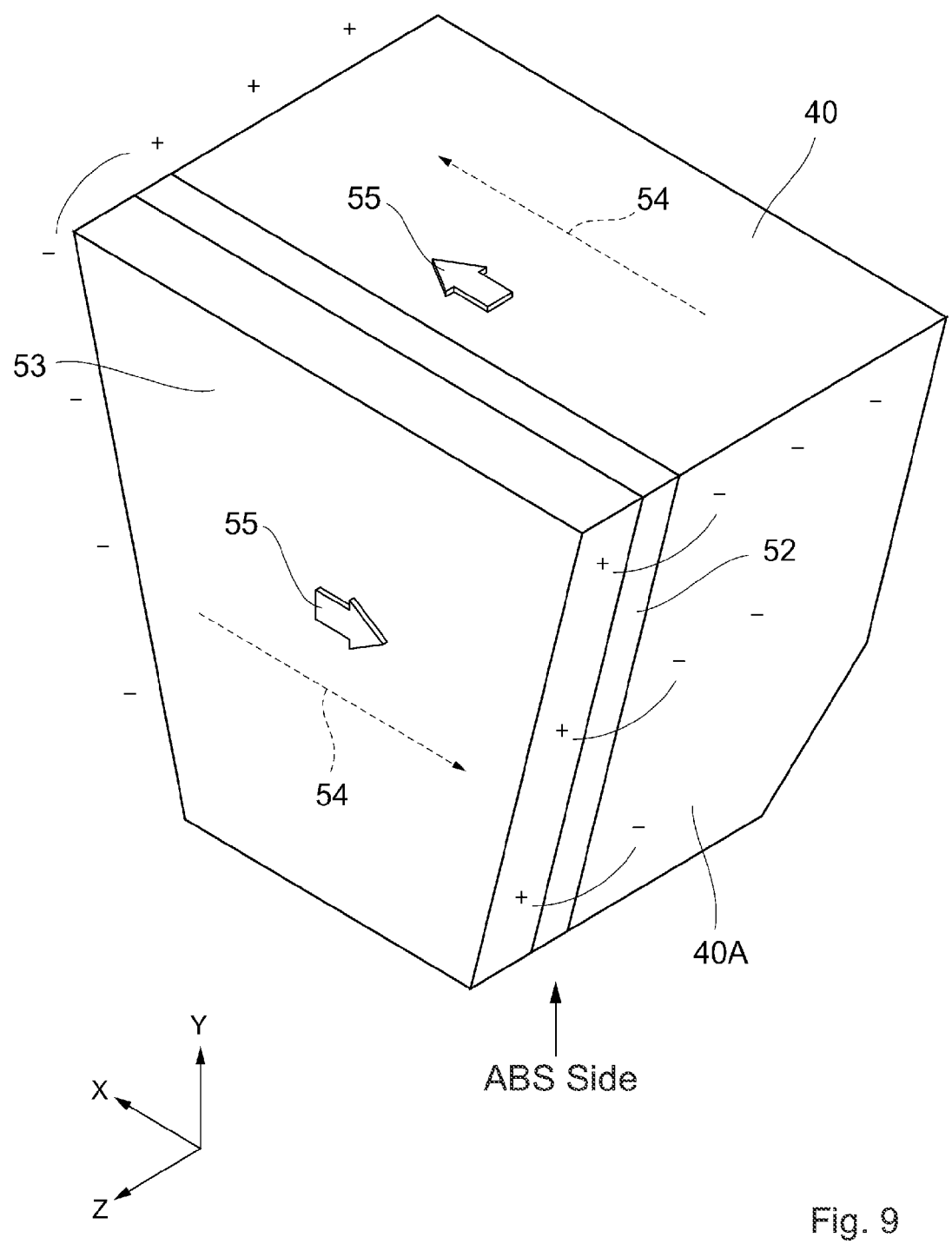
FIG. 9 is perspective view of a main magnetic pole from the perspective of a magnetic recording gap part illustrated in FIG. 8.

FIG. 9 is a perspective view illustrating a structural example of the main magnetic pole film 40 of the microwave assisted magnetic head in the cross track direction (X direction) according to the first and second embodiments. Easy magnetization axes 54 are provided in the first soft magnetic film 40 and the second soft magnetic film 53 by applying a direct-current (DC) magnetic field in the track width direction from an outside during film formation, and thereby an antiferromagnetic coupling structure is formed via the nonmagnetic film 52 that is an ultrathin film made of Ru, Rh, Cr, Re, Au, Ag, or Pt having the thickness of 1-5 (nm). As a result, closed magnetic paths that circulate via the first soft magnetic film 40 and the second soft magnetic film 53 are formed, and a bias magnetic field 55 in the track width direction is applied to either of the soft magnetic films. The bias magnetic field that is applied has the function of further increasing the ferromagnetic resonance frequency fR. The frequency of AC current that is driven to the secondary coil 51 is limited to the ferromagnetic resonance frequency fR of the soft magnetic films; however, the ferromagnetic resonance frequency fR is increased by increasing the anisotropy fields Hk of the soft magnetic films and by applying the bias magnetic field, allowing to increase the frequency of the AC current that is driven to the secondary coil.

During the film formation of the first soft magnetic film and the second soft magnetic film, a DC magnetic field in the track width direction is applied from an outside to provide the easy magnetization axes; the antiferromagnetic coupling structure is formed via the nonmagnetic film; and the closed magnetic paths that circulate via the first soft magnetic film and the second soft magnetic film are formed. As a result, the bias magnetic field in the track width direction is applied to either one of the soft magnetic films. Thereby, the fR of the second soft magnetic film is further increased, allowing to further increase the frequency of the high frequency current that drives the secondary coil to approximately 10-30 G (Hz).

When recording current that corresponds to data is applied to the main coil, the first soft magnetic film of the magnetic pole tip part that is the tip portion of the main magnetic pole is magnetically saturated; however, the second soft magnetic film with large Hk is not magnetically saturate, allowing the linear response of a high frequency magnetic flux. As a result, when high frequency current at 10-30 G(Hz) is driven to the secondary coil that is arranged in the vicinity of the trailing shield and the magnetic recording gap, an intense in-plane high frequency magnetic field at approximately 1 k (Oe) is generated from the magnetic recording gap. Thereby, the magnetization reversal of the recording medium is assisted, and high density recording can be realized.

Because the first soft magnetic film and the second soft magnetic film form the antiferromagnetic coupling structure via the nonmagnetic film, a residual magnetization state is stable, so that pole erasure and side erase are reduced. As a result, long-term stable holding of recorded data becomes possible, and the reliability of the HDD is increased.

Figure 10:
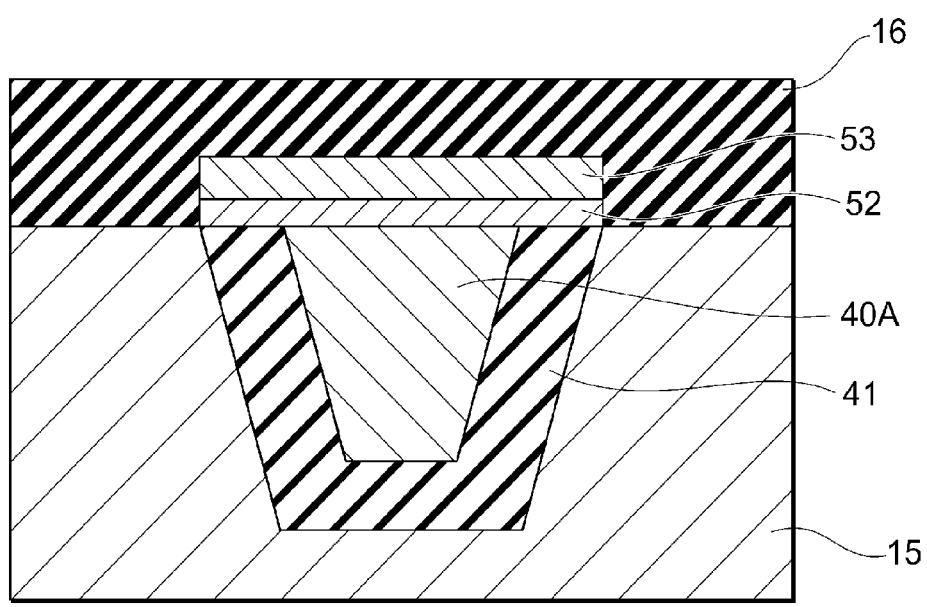
FIG. 10 illustrates a modified example of a wrap-around structure according to the first embodiment.

FIG. 10 illustrates a structural example according to the first embodiment (FIG. 5) from the perspective of the ABS. According to the structural example, the shape of the main magnetic pole film from the perspective of the ABS 70 is a trapezoidal shape whose side on the trailing side is a long side. On both side surfaces of the recording magnetic pole part 40A on the ABS side, the recording magnetic pole part 40A being the tip portion of the main magnetic film 40, the writing shield film 15 is arranged via the magnetic gap film 41 therebetween.

On the trailing end of the recording magnetic pole part 40A, the ultrathin nonmagnetic film 52 and the second soft magnetic film 53 are laminated. The lamination widths of the ultrathin nonmagnetic film 52 and the second soft magnetic film 53 are larger than the trailing width (on the side of the long side of the trapezoid illustrated in FIG. 10) of the recording magnetic pole part 40A. In the present structural example, the recording track width of the recording medium is determined by the trailing width of the recording magnetic pole part 40A that is larger than the other one.

Figure 11:
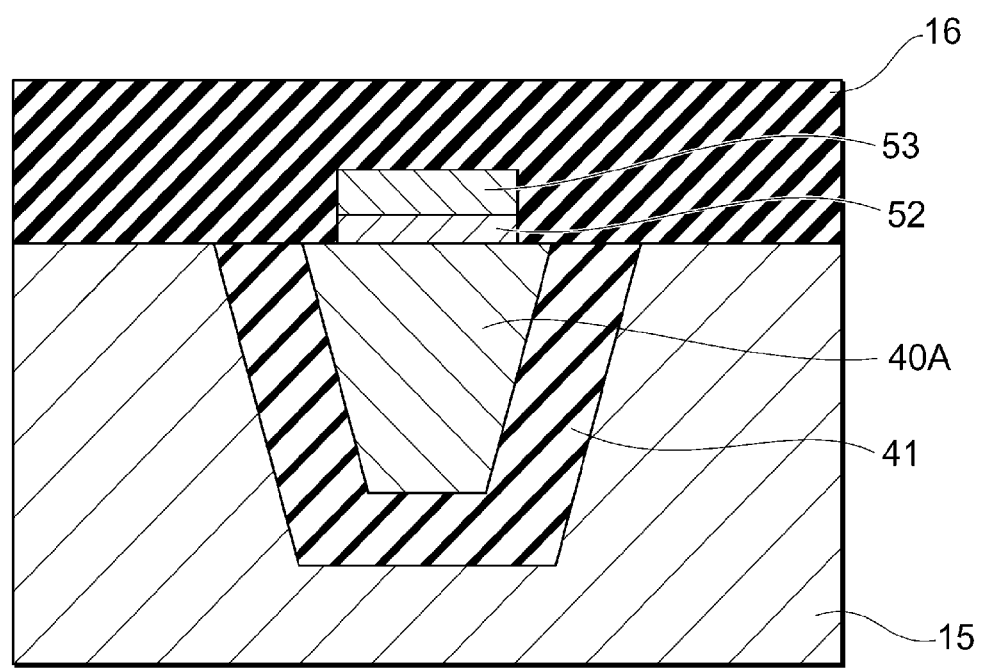
FIG. 11 illustrates a modified example of a wrap-around structure according to the second embodiment.

FIG. 11 illustrates another structural example according to the second embodiment (FIG. 7) from the perspective of the ABS. According to the present structural example, the shape of the main magnetic pole film from the perspective of the ABS 70 is a trapezoidal shape whose side on the trailing side is a long side. On the trailing end of the recording magnetic pole part 40A, the ultrathin nonmagnetic film 52 and the second soft magnetic film 53 are laminated. The lamination widths of the ultrathin nonmagnetic film 52 and the second soft magnetic film 53 are smaller than the trailing width of the recording magnetic pole part 40A. In the present structural example, the recording track width of the recording medium is determined by the lamination widths of the ultrathin nonmagnetic film 52 and the second soft magnetic film 53. Even when the lamination width of the second soft magnetic film 53 is equal to the trailing width of the recording magnetic pole part 40A, the recording track width is determined by the same way.

When the ultrathin nonmagnetic film 52 and the second soft magnetic film 53 are laminated at the trailing end of the recording magnetic pole 40A in the wrap-around structure according to the second embodiment (FIG. 7), by replacing the magnetic recording gap film 16 illustrated in FIGS. 10 and 11 with the magnetic gap film 41, the structure in which the recording magnetic pole part 40A is embedded in the writing shield film 115, which is like the second embodiment (FIG.

7), is obtained. Also in the present structural example, the recording track width of the recording medium is determined in the same way as the above-described case of FIGS. 10 and 11.

As described above, the embodiments and the examples regarding its application to the wrap-around structure are described; however, the above-described combinations are not unique and are variable depending on the difference of process structure.

EXAMPLE

Figure 12A:
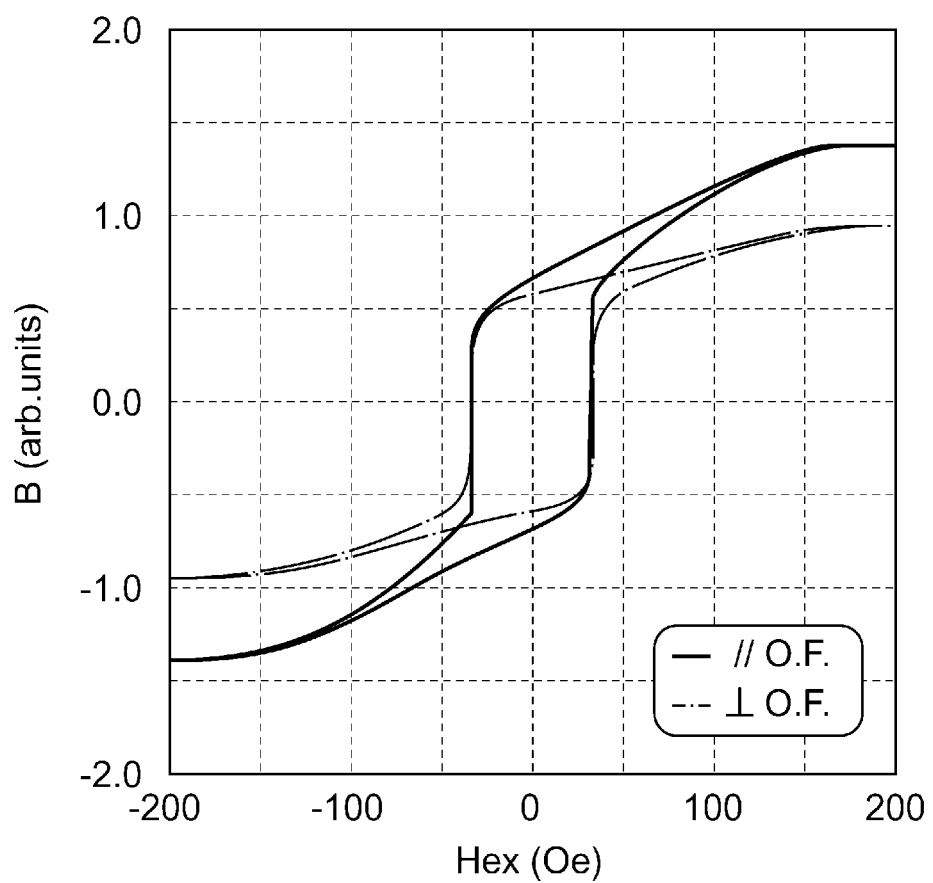
FIG. 12A illustrates a B-H curve of a FeCoB magnetic film of a second soft magnetic film before annealing according to the embodiments.
Figure 12B:
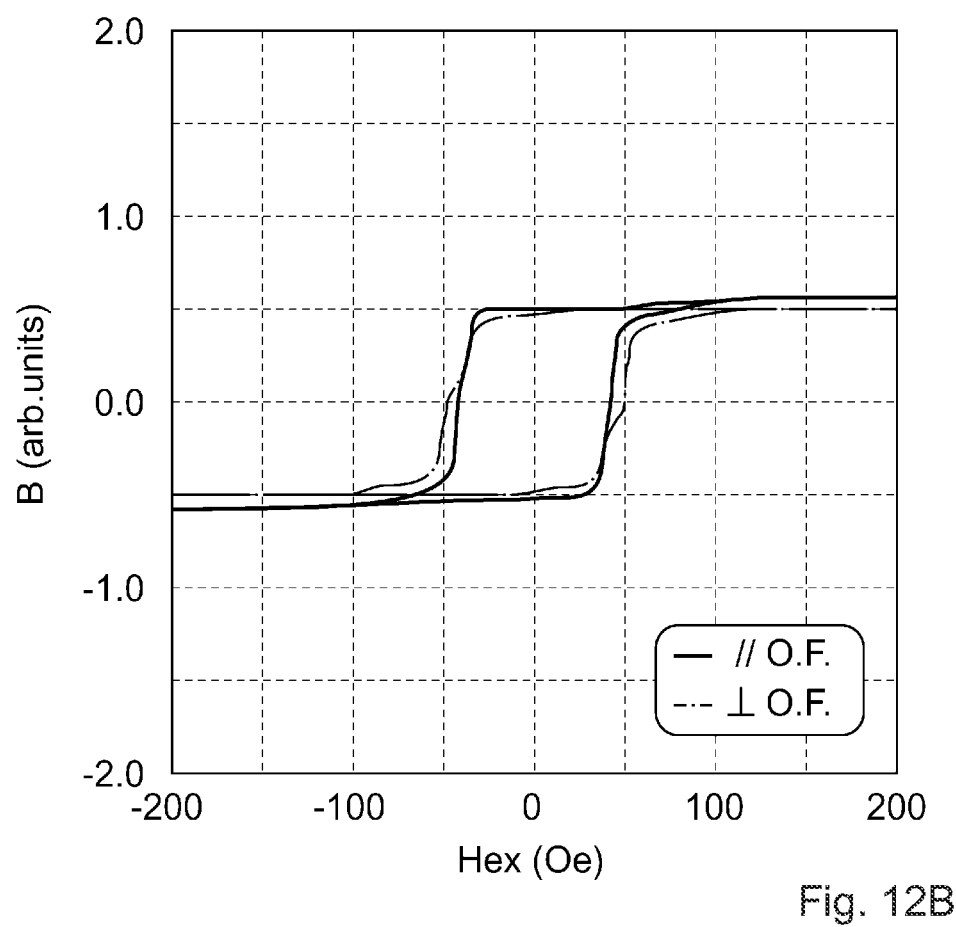
FIG. 12B illustrates a B-H curve of the FeCoB magnetic film of the second soft magnetic film after annealing according to the embodiments.

FIGS. 12A and 12B illustrate film formation examples of a FeCoB film 53 of the second soft magnetic film 53 that has magnetic anisotropy in the in-plane direction of the film surface and the perpendicular direction of the film surface according to the first and second embodiments.

FIG. 12A is a B-H curve of the FeCoB film 53 of the second soft magnetic film 53 after a film formation by a plating method and before annealing. In the figures, the "//O.F." indicates a magnetic anisotropy hysteresis curve of the magnetic anisotropy in the in-plane direction of the film surface; and "⊥ O.F." indicates a magnetic anisotropy hysteresis curve of the magnetic anisotropy in the perpendicular direction of the film surface. At this time, Hc in the in-plane direction is 33.8 (Oe), and Hc in the perpendicular direction is 31.3 (Oe). It can be recognized that no magnetic anisotropy is provided in the in-plane direction of the film surface or the perpendicular direction of the film surface at this point.

FIG. 12B is a B-H curve of the FeCoB film 53 of the second soft magnetic film 53 after a film formation by a plating method and after annealing. It can be recognized that by performing the annealing after the film formation by the plating method, the magnetic anisotropy is provided in the in-plane direction of the film surface and the perpendicular direction of the film surface. The second soft magnetic film 53 is mainly composed of Fe, Co, and B, and the addition of B is 5-20 (at %). The second soft magnetic film 53 has anisotropy in parallel and perpendicular directions of the film surface, and an effective anisotropy magnetic field is 60-800 (Oe), a saturation magnetic flux density is 2.0-2.4 (T), and a film thickness thereof is 5-20 (nm). At this time, the Hc in the in-plane direction is 50.2 (Oe), and the Hc in the perpendicular direction is 44.1 (Oe). Orientation thereof is high, and Hc≈Hk. According to a calculation, the effective anisotropy field Hkeff is expressed as "$((50.2)^2+(44.1)^2)^{1/2}=66.8$ (Oe)." Compared to Hc=33.8 (Oe), which is the Hc in only the in-plane direction before annealing, the Hc increased 33%, which is 66.8−33.8=33(Oe). The present method is the effective producing method to increase the ferromagnetic resonance frequency fR.

Figure 13:
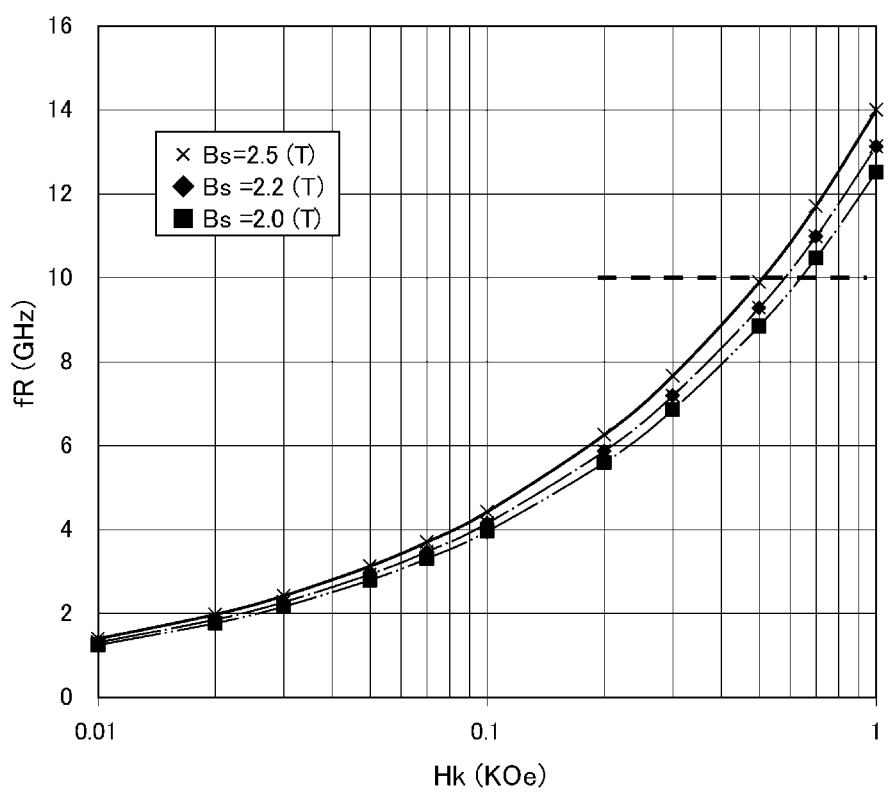
FIG. 13 illustrates the dependency of ferromagnetic resonance frequency fR on Hk when a parameter thereof is a saturation magnetic flux density of the second soft magnetic film according to the embodiments.

FIG. 13 illustrates the relationship between the anisotropy field Hk and the ferromagnetic resonance frequency fR using the saturation magnetic flux density Bs of the second soft magnetic film as a parameter according to the first and second embodiments. It can be recognized that the a of a vertical axis rapidly increases when the Hk of a horizontal axis increases to 100 (Oe) or more and that the larger Bs indicated by three parameter curves has the larger increasing ratio. For example, when the Hk increases to approximately 600 (Oe), the fR increases to around 10 G (Hz).

Figure 14:
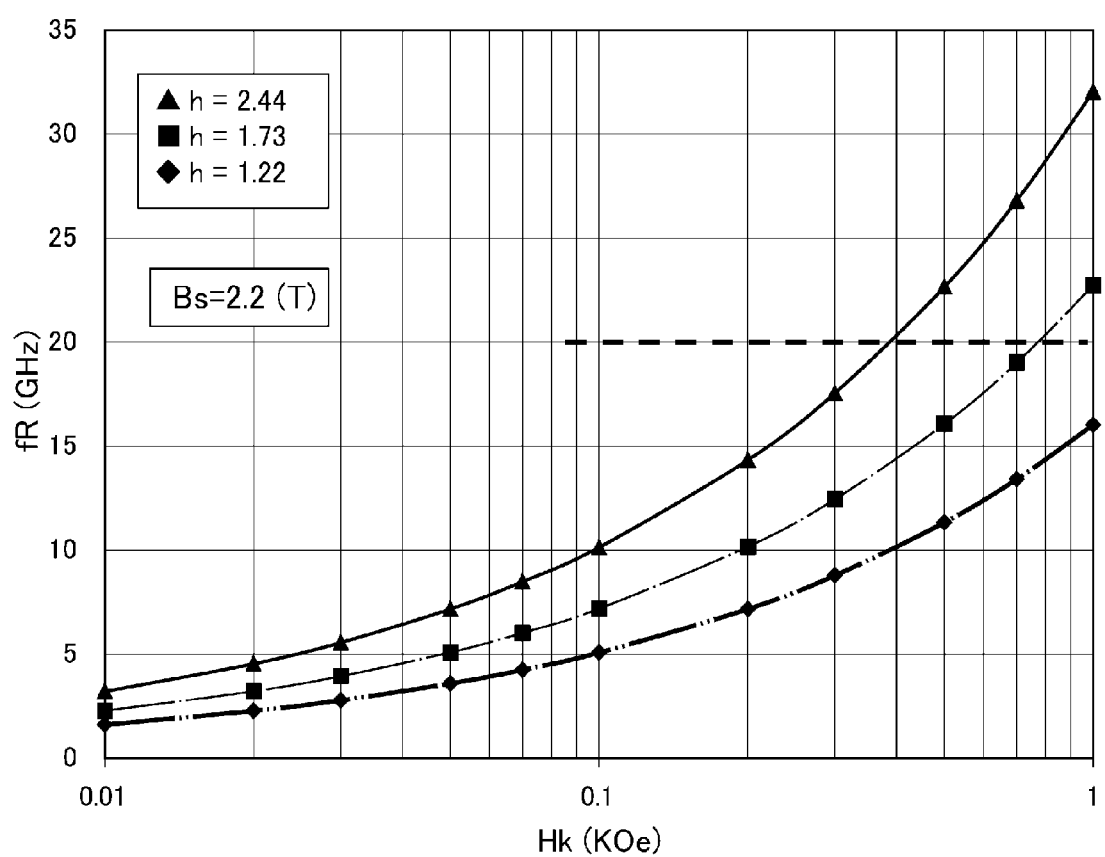
FIG. 14 illustrates the dependency of ferromagnetic resonance frequency fR on Hk when a parameter thereof is a bias magnetic field of the second soft magnetic film according to the embodiments.

FIG. 14 illustrates the relationship between the anisotropy field Hk and the ferromagnetic resonance frequency fR using "h" that is the amount of the bias magnetic field that is applied to the second soft magnetic film according to the first and second embodiments. Herein, "h" is defined as "h=(HB+Hk)/Hk" (HB; bias magnetic field). As in FIG. 13, it can be recognized that the fR of a vertical axis rapidly increases when the Hk of a horizontal axis increases to 100 (Oe) or more and that the larger "h" indicated by the three parameter curves has the larger increasing ratio. When the "h" increases to 2.44 (h=2.44) by increasing the HB, and when the Hk also increases to approximately 800 (Oe), the fR can be increased to a high frequency around 30 G (Hz).

What is claimed is:

1. A microwave assisted magnetic head, comprising:
a main magnetic pole;
a trailing shield;
a main coil for causing the main magnetic pole to generate a perpendicular recording field;
at least one secondary coil for generating an in-plane alternate-current (AC) magnetic field with a frequency in a microwave band from a magnetic recording gap between the main magnetic pole and the trailing shield;
nonmagnetic films formed on magnetic recording gap facing surfaces that are defined by the main magnetic pole and the trailing shield, the main magnetic pole and the trailing shield being configured with first soft magnetic films; and
second soft magnetic films formed further on the surfaces of the nonmagnetic films, wherein
the second soft magnetic films have larger anisotropy fields than the first soft magnetic films have.

2. The microwave assisted magnetic head according to claim 1, further comprising:
a plurality of the secondary coils.

3. The microwave assisted magnetic head according to claim 1, wherein
easy magnetization axes are provided with the first soft magnetic films and the second soft magnetic films in a track width direction,
antiferromagnetic coupling structures are formed via the nonmagnetic films, and
closed magnetic paths that circulate though the first soft magnetic films and the second soft magnetic films are formed.

4. The microwave assisted magnetic head according to claim 1, wherein
lamination widths in a track width direction of the nonmagnetic film and the second soft magnetic film that are formed at a trailing of the main magnetic pole are larger than a trailing width of the main magnetic pole.

5. The microwave assisted magnetic head according to claim 1, wherein
lamination widths in a track width direction of the nonmagnetic film and the second soft magnetic film that are formed at a trailing of the main magnetic pole are equal to or smaller than a trailing width of the main magnetic pole.

6. The microwave assisted magnetic head according to claim 1, wherein
in a view from an air bearing surface, a circumference of the main magnetic pole is covered by a magnetic gap film and a magnetic recording gap film that continue, and
a writing shield film is arranged in a periphery of the magnetic gap film and the magnetic recording gap film.

7. The microwave assisted magnetic head according to claim 1, wherein
on an air bearing surface of the main magnetic pole, the main magnetic pole has a trapezoidal shape of which a long side is on a trailing side of the main magnetic pole.

8. The microwave assisted magnetic head according to claim 1, wherein
with respect to the first soft magnetic film,
Fe and Co are main components,
the anisotropy field is 5-30 (Oe), and
a saturation magnetic flux density is 2.2-2.4 (T).

9. The microwave assisted magnetic head according to claim 1, wherein
with respect to the second soft magnetic film,
Fe, Co and B are main components,
an addition amount of B is 5-20 (at %),
the second soft magnetic film has an anisotropy parallel to a film surface and an anisotropy field thereof is 40-800 (Oe),
a saturation magnetic flux density is 2.0-2.4 (T), and
a film thickness is 5-20 (nm).

10. The microwave assisted magnetic head according to claim 1, wherein
with respect to the second soft magnetic film,
Fe, Co and B are main components,
an addition amount of B is 5-20 (at %),
the second soft magnetic film has an anisotropy in a parallel and perpendicular directions to a film surface, and an anisotropy field thereof is 60-800 (Oe),
a saturation magnetic flux density is 2.0-2.4 (T), and
a film thickness is 5-20 (nm).

11. The microwave assisted magnetic head according to claim 1, wherein
a material of the nonmagnetic film that is formed on the one of the magnetic recording gap facing surfaces of the first soft magnetic film is Ru, Rh, Cr, Re, Au, Ag, or Pt, and a film thickness thereof is 1-5 (nm).

12. The microwave assisted magnetic head according to claim 1, further comprising:
a reproducing element provided with a magneto-resistive effect element having one of a TMR element and a GMR element.

13. A magnetic recording method using the microwave assisted magnetic head according to claim 1, wherein,
a perpendicular recording field is generated from a recording magnetic pole part that is a tip portion of the main magnetic pole to a recording medium by driving a recording current that corresponds to data to the main coil, and coincidentally
an in-plane alternate-current (AC) magnetic field is generated from the magnetic recording gap between the main magnetic pole and the trailing shield by driving AC current in a microwave band to the secondary coil in order to assist magnetization reversal of the recording medium.

14. A magnetic recording method using the microwave assisted magnetic head according to claim 1, wherein
a frequency of alternate-current (AC) current that drives the secondary coil is a high frequency, which is equal or close to a ferromagnetic resonance frequency of a recording medium, or of which band is within approximately 5-30 G(Hz), which is close to the ferromagnetic resonance frequency, and
an in-plane alternate-current magnetic field generated by the frequency is less intense than a perpendicular recording field.

* * * * *